(12) United States Patent
Yamamoto

(10) Patent No.: US 8,542,377 B2
(45) Date of Patent: Sep. 24, 2013

(54) IMAGE FORMING APPARATUS FOR ENABLING PRINTING OF CONFIDENTIAL IMAGE DATA

(75) Inventor: Yuuki Yamamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 304 days.

(21) Appl. No.: 13/014,247

(22) Filed: Jan. 26, 2011

(65) Prior Publication Data

US 2011/0211215 A1     Sep. 1, 2011

(30) Foreign Application Priority Data

Feb. 26, 2010   (JP) .................................. 2010-41571

(51) Int. Cl.
*G06K 15/00* (2006.01)
(52) U.S. Cl.
USPC ............. 358/1.14; 358/1.15; 726/27; 726/28
(58) Field of Classification Search
USPC ................... 358/1.8, 1.13, 1.14, 1.15; 347/1;
709/203; 726/4, 26, 27, 28
See application file for complete search history.

(56) References Cited

U.S. PATENT DOCUMENTS

| 2005/0120244 A1* | 6/2005 | Choi | 713/201 |
| 2005/0128506 A1* | 6/2005 | Sato | 358/1.14 |
| 2005/0134896 A1* | 6/2005 | Koga | 358/1.14 |
| 2006/0028530 A1* | 2/2006 | Nishiyama | 347/153 |
| 2007/0127050 A1* | 6/2007 | Iwata et al. | 358/1.13 |
| 2009/0073483 A1* | 3/2009 | Oomori | 358/1.14 |
| 2009/0268224 A1* | 10/2009 | Takahashi | 358/1.14 |
| 2009/0328159 A1* | 12/2009 | Luo | 726/4 |

FOREIGN PATENT DOCUMENTS

| JP | 2001-282477 | 10/2001 |
| JP | 2005-303640 | 10/2005 |
| JP | 2007-257388 | 10/2007 |
| JP | 2009-286024 A | 12/2009 |

OTHER PUBLICATIONS

Japanese Office Action dated Apr. 17, 2012.
English Translation of Japanese Publication No. 2001-282477.
English Translation of Japanese Publication No. 2005-303640.
English Translation of Japanese Publication No. 2007-257388.

* cited by examiner

*Primary Examiner* — King Poon
*Assistant Examiner* — David S Cammack

(57) ABSTRACT

When new image data is received by a communication I/F portion, a determination portion determines whether or not a password set to image data stored in the storage portion coincides with a password set to new image data received by the reception portion. A second image forming control portion does not execute image formation based on the new image data with a first image forming control portion when the determination portion determines that a password set to image data stored in the storage portion coincides with a password set to new image data received by the communication I/F portion.

3 Claims, 5 Drawing Sheets

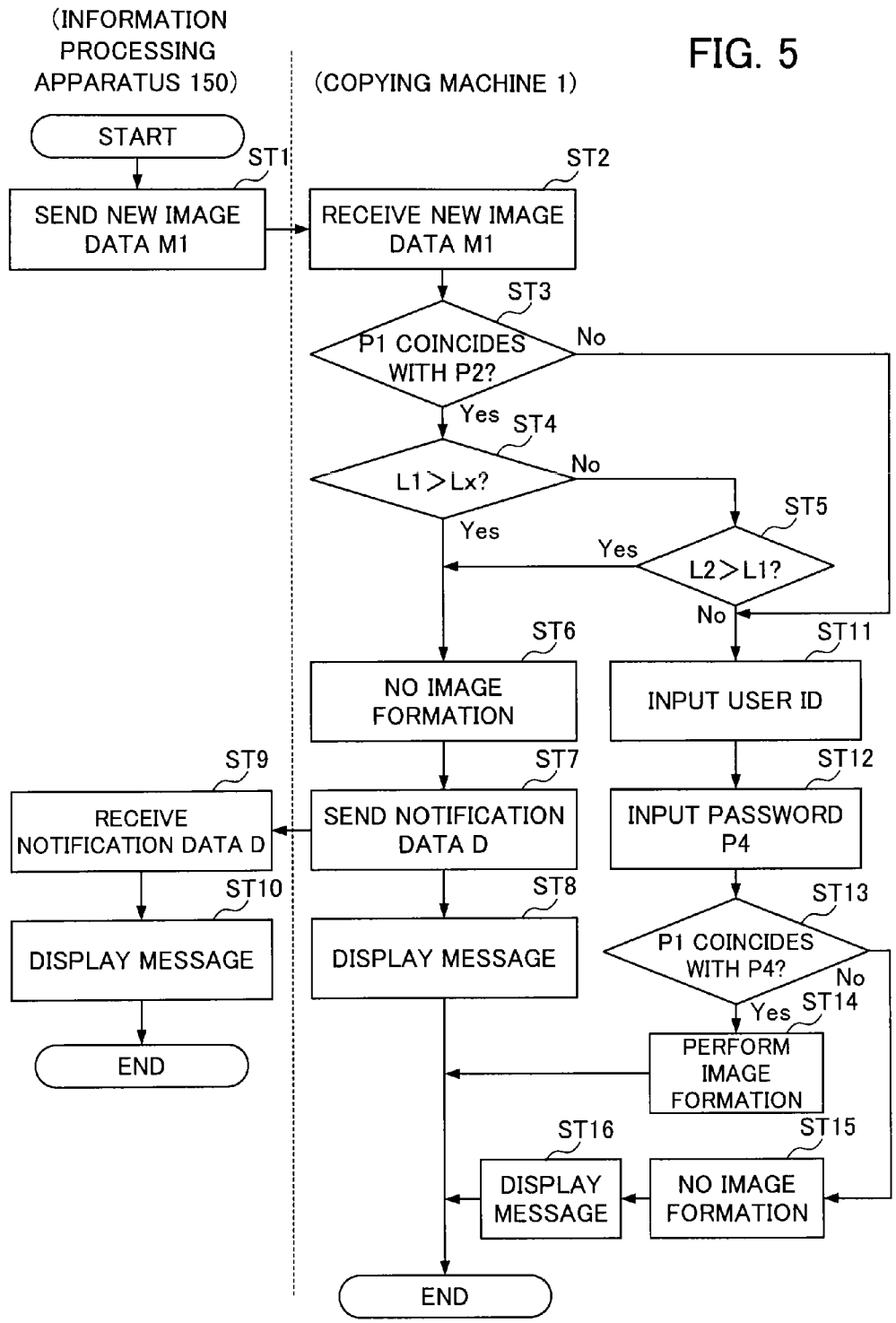

IMAGE FORMING APPARATUS FOR ENABLING PRINTING OF CONFIDENTIAL IMAGE DATA

This application is based upon and claims the benefit of priority from the corresponding Japanese Patent Application No. 2010-041571 filed on 26 Feb. 2010, the entire content of which are incorporated herein by reference.

BACKGROUND OF THE INVENTION

1. Field of the Invention

The present invention relates to a copying machine, a printer, a facsimile, or to an image forming apparatus such as a multifunction peripheral combining these apparatuses.

2. Related Art

A conventional apparatus forming (printing) an image on a transfer medium (paper sheet) includes a copying machine, a printer, facsimile, or an image forming apparatus such as a multifunction peripheral combining these apparatuses. This type of image forming apparatus is connected with an external device such as a personal computer by a LAN (local area network) or the like, to thereby enable printing of image data sent from the external device to the image forming apparatus. In particular, within a company, a single image forming device is often connected to a plurality of external devices via a LAN, and the users of each of the external devices use the single image forming apparatus in common.

Confidential image data such as business project documents during a planning stage may be included in the image data sent from such an external device to the image forming apparatus. Techniques have been proposed for suitable printing of confidential documents when a single image forming apparatus is used by connection with a plurality of external devices.

For example, an image forming apparatus is known that includes a reception portion that receives image data with a password applied thereto from the external device, a storage portion that stores the received image data, an input portion that inputs a password from a user, and an image forming control portion that forms an image on a transfer medium based on the image data when a password set to image data stored in the storage portion coincides with a password input from the input portion.

However in this type of conventional image forming apparatus, as a result of user error, or when the same password is accidentally set to different image data, there is the risk of loss of confidentiality in relation to the image data in the event that image data that should not be printed is printed as a result of input of a password by a user.

Thus the present invention has the object of providing an image forming apparatus that enables more suitable printing of confidential image data.

SUMMARY OF THE INVENTION

The present invention relates to an image forming apparatus including a reception portion that receives image data with a password applied thereto from an external device, a storage portion that stores the image data received by the reception portion, an input portion that inputs a password from a user, a first image forming control portion that forms an image on a transfer medium based on the image data when a password set to image data stored in the storage portion coincides with a password input from the input portion, a determination portion that determines whether or not a password set to new image data coincides with a password set to image data stored in the storage portion, when new image data is received by the reception portion, and a second image forming control portion that does not execute formation of images based on the new image data by the first image forming control portion when the determination portion determines that the password set to image data stored in the storage portion coincides with the password set to new image data received by the reception portion.

According to the present invention, an image forming apparatus is provided that enables more suitable printing of confidential image data.

BRIEF DESCRIPTION OF THE DRAWINGS

FIG. 5 is a flowchart showing the process of forming an image by a copying machine 1 using image data having a password set thereto.

DETAILED DESCRIPTION OF THE INVENTION

Figure 1:
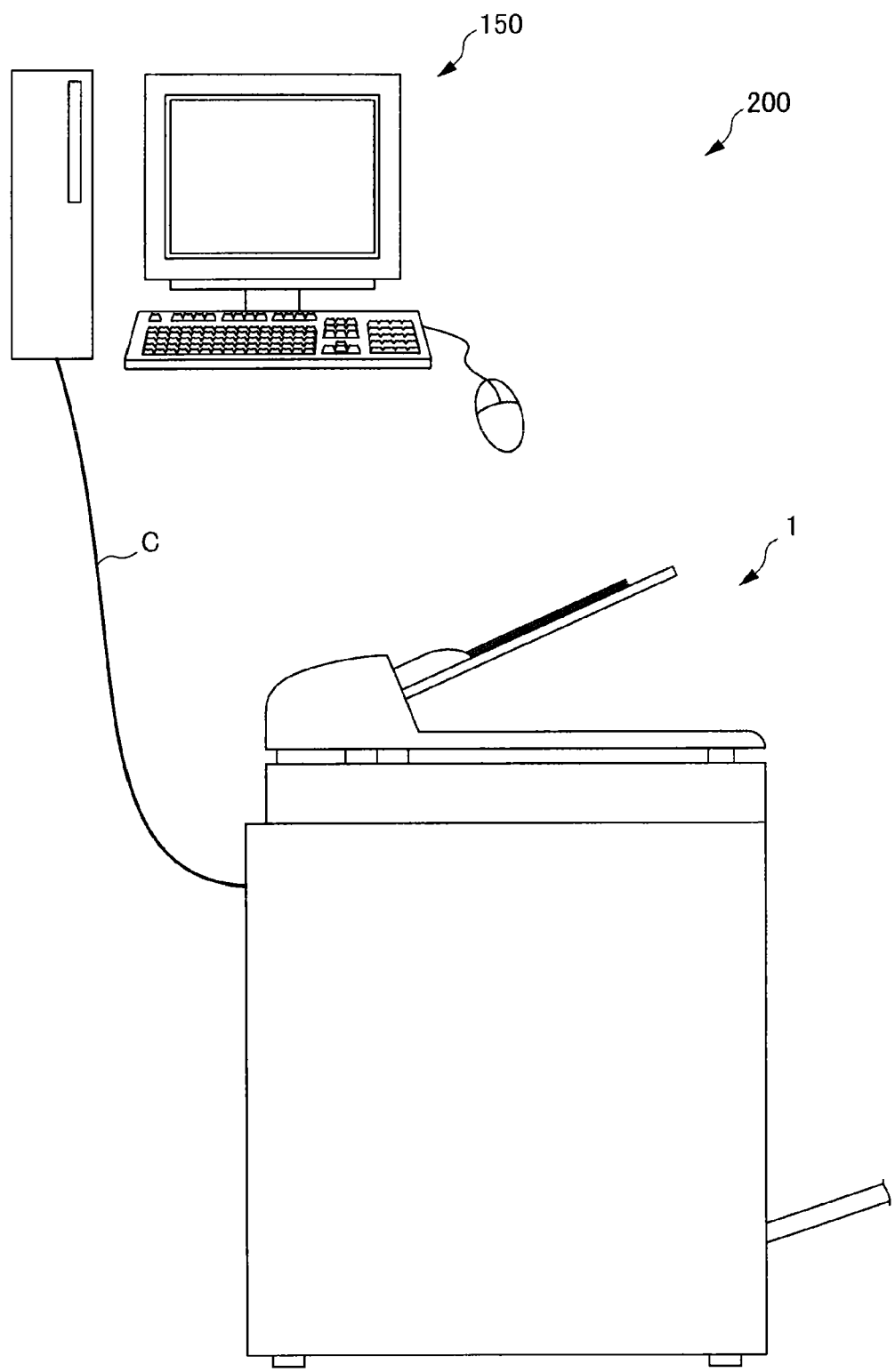
FIG. 1 describes the overall configuration of an image forming system 200 according to a first embodiment of an image forming apparatus according to the present invention.

An image forming system 200 according to a first embodiment of the image forming apparatus according to the present invention will be described below making reference to the figures. FIG. 1 describes the overall configuration of an image forming system 200 according to the first embodiment of the image forming apparatus according to the present invention.

The image forming system 200 includes a copying machine 1 and an information processing apparatus 150 as an external device. The information processing apparatus 150 is configured as a personal computer, or the like.

The information processing apparatus 150 is connected to enable communication with the copying machine 1 by a LAN (local area network) or the like through a communication cable C. The copying machine 1 and the information processing apparatus 150 in the present embodiment may be connected to enable communication by a fixed line through the communication cable C. However the present invention is not limited in this regard, and connection may be performed to enable communication in a wireless manner using a wireless LAN or the like.

Figure 2:
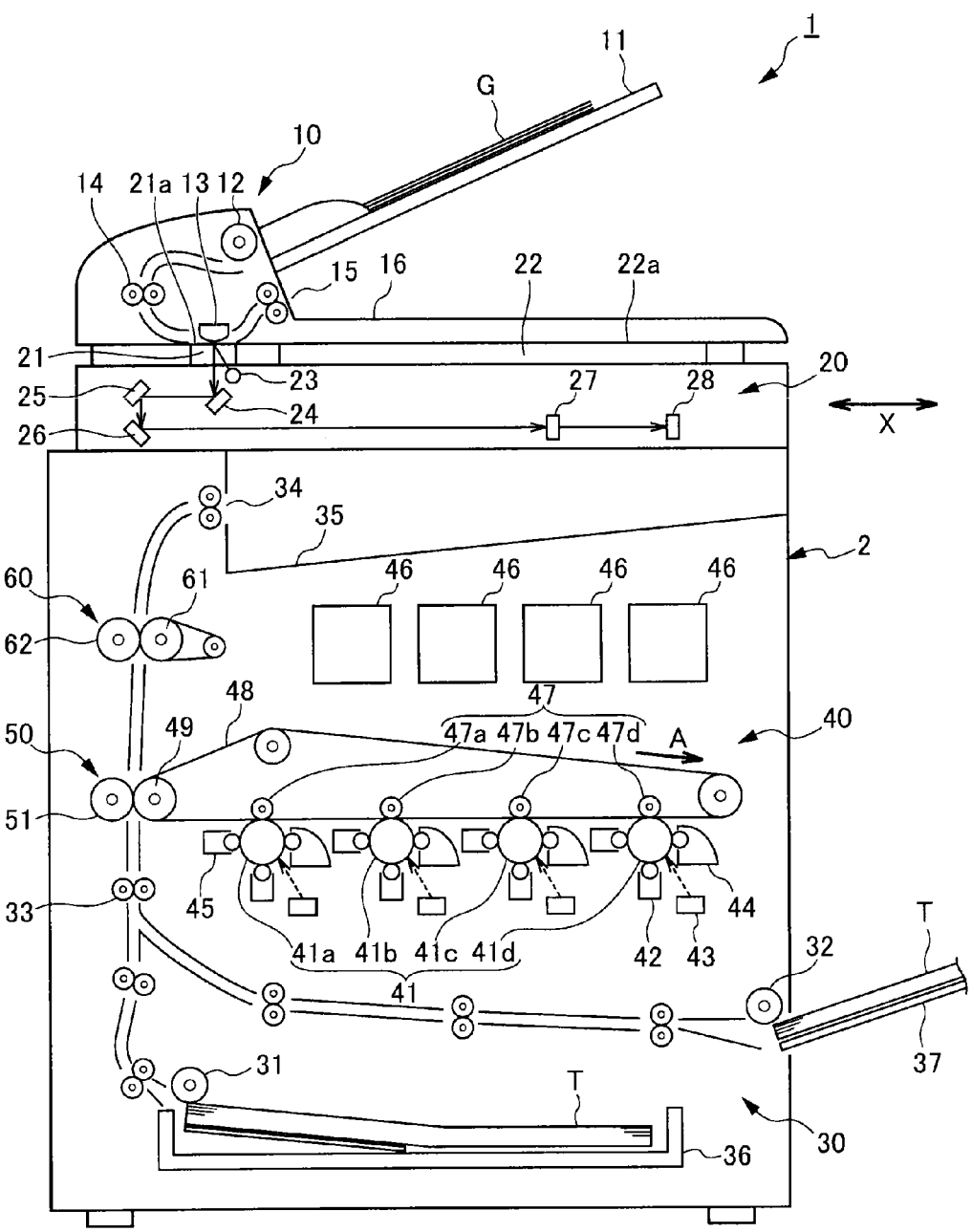
FIG. 2 describes the overall configuration of a copying machine 1 according to the first embodiment of the image forming apparatus.

Next, the overall configuration of the copying machine 1 will be described. FIG. 2 describes the overall configuration of a copying machine 1 according to the first embodiment of the image forming apparatus.

The copying machine 1 includes an original conveying portion 10, an original reader portion 20, a paper conveying portion 30, an image forming portion 40, a transfer portion 50, and a fixing portion 60.

The original conveying portion 10 is composed by an ADF (auto document feeder), and includes an original placing portion 11, a first feeding roller 12, a guide 13, a timing roller pair 14, and an original ejection portion 15. The first feeding roller 12 supplies an original G mounted on the original placing portion 11 in order of single sheets to the timing roller pair 14. The timing roller pair 14 conveys the original G or stops the conveyance of the original G in order to make the timing of the reading of the original G by the original reader portion 20 coincide with the timing of supplying the original G to the position for reading of the original G by the original reader portion 20 (position at which the guide 13 is disposed). The guide 13 introduces the conveyed original G to a first reading surface 21a as described below. The original ejection portion 15 ejects an original G read by the original reader portion 20 (passed through the guide 13) to an external portion of the copying machine main body 2.

An original accumulating portion 16 is formed on an outer side of the copying machine main body 2 in the original ejection portion 15. An original G ejected from the original ejection portion 15 is stacked and collected in the original accumulating portion 16.

The original reader portion 20 includes the first reading surface 21a and a second reading surface 22a. The first reading surface 21a is formed along the upper surface of a first contact glass 21 disposed facing the guide 13, and forms the reading surface of the original G. The second reading surface 22a is disposed adjacently to the first reading surface 21a (as shown in FIG. 2, along the majority of the right side of the first reading surface 21a). The second reading surface 22a is used when reading an original G without using the original conveying portion 10. The second reading surface 22a is formed along the upper surface of a second contact glass 22 mounting the original G, and forms the reading surface of the original G.

The original reader portion 20 includes an illumination portion 23, a first mirror 24, a second mirror 25, a third mirror 26, an imaging lens 27, and an image capturing portion 28, that are provided in an inner portion of the copying machine main body 2. The illumination portion 23 and the first mirror 24 are disposed respectively in a sub-scanning direction X. The second mirror 25 and the third mirror 26 are disposed on the left side of the illumination portion 23 and the first mirror 24 in FIG. 2. Furthermore, the second mirror 25 and the third mirror 26 respectively displace in the sub-scanning direction X while maintaining a fixed distance (optical path length) from the first reading surface 21a or the second reading surface 22a to the image capture portion 28, the distance passing through the first mirror 24, the second mirror 25, the third mirror 26, and the imaging lens 27.

The illumination portion 23 is a light source that illuminates light onto the original G. The first mirror 24, the second mirror 25, and the third mirror 26 are mirrors that maintain a fixed optical path length while introducing light reflected by the original G to the imaging lens 27. The imaging lens 27 images light that is incident from the third mirror 26 onto the image capturing portion 28. The image capturing portion 28 includes a plurality of image capturing elements arrayed along the main scanning direction (a direction that is orthogonal to the sub-scanning direction X). The image capturing elements are elements for obtaining image data based on a focused light image by converting the incident light to an electrical signal, and for example may be a charge coupled device (CCD) or the like.

The paper conveying portion 30 includes a second feeding roller 31, a third feeding roller 32, a resist roller pair 33, and a paper ejection portion 34. The second feeding roller 31 supplies a paper T (transfer medium) contained in the paper feeding 36 to the transfer portion 50. The third feeding roller 32 supplies a paper T (transfer medium) mounted on the manual feeding tray 37 to the transfer portion 50. The resist roller pair 33 conveys the paper T or stops the conveyance of the paper T in order to make the timing of the forming of a toner image on the transfer portion 50 coincide with the timing of supplying the paper T to the transfer portion 50. The resist roller pair 33 corrects skew (inclination of the supplied paper) of the paper T. The paper ejection portion 34 ejects a paper T having a toner image fixed thereto to an external portion of the copying machine main body 2.

An ejected paper accumulating portion 35 is formed on an outer side of the copying machine main body 2 in the paper ejection portion 34. A paper T discharged from the paper ejection portion 34 is stacked and collected in the ejected paper accumulating portion 35.

The image forming portion 40 includes a photoreceptor drum 41, a charging member 42, a laser scanning portion 43, a developing portion 44, a cleaning portion 45, a toner cartridge 46, a primary transfer roller 47, an intermediate transfer belt 48, and an opposing roller 49.

The photoreceptor drum 41 (41a, 41b, 41c, 41d) functions as a photoreceptor or an image bearing member to form respective toner images from black, cyan, magenta and yellow. The charging member 42, the laser scanning portion 43, the developing portion 44, and the cleaning portion 45 are disposed in order from upstream to downstream along the rotation direction of the photoreceptor drum 41 in the periphery of each photoreceptor drum 41a, 41b, 41c, and 41d.

The charging member 42 applies a charge to the surface of the photoreceptor drum 41. The laser scanning portion 43 is disposed at a distance from the surface of the photoreceptor drum 41, and the surface of the photoreceptor drum 41 is scanned and exposed based on the image data related to the original G that is read by the original reader portion 20. In this manner, a charge on the exposed portion on the surface of the photoreceptor drum 41 is removed to thereby form an electrostatic latent image. The developing portion 44 attaches toner to the electrostatic latent image formed on the surface of the photoreceptor drum 41 to thereby form a toner image. After the static charge is removed from the surface of the photoreceptor drum 41 by a charge removal device (not shown), the cleaning portion 45 removes residual toner from the surface.

The toner cartridge 46 contains respective colors of toner supplied to the developing portion 44. The toner cartridge 46 and the developing portion 44 are connected by a toner supply passage (not shown).

The primary transfer rollers 47 (47a, 47b, 47c, 47d) are respectively disposed opposite each photoreceptor drum 41a, 41b, 41c, 41d in the intermediate transfer belt 48. The intermediate transfer belt 48 is a belt passing through the image forming portion 40 and the transfer portion 50. A part of the intermediate transfer belt 48 is sandwiched between each photoreceptor drum 41a, 41b, 41c, 41d and each primary transfer roller 47a, 47b, 47c, 47d. Primary transfer of a toner image formed on the surface of each photoreceptor drum 41a, 41b, 41c, 41d is executed onto the intermediate transfer belt 48. The counter roller 49 is a drive roller disposed on an inner side of the annular intermediate transfer belt 48, and propels the intermediate transfer belt 48 in the direction A of the arrow as shown in FIG. 2.

The transfer portion 50 includes a secondary transfer roller 51. The secondary transfer roller 51 is disposed opposite the opposing roller 49 in the intermediate transfer belt 48 and sandwiches a portion of the intermediate transfer belt 48 with the opposing roller 49. The secondary transfer roller 51 executes secondary transfer onto the paper T of the toner image that has been subjected to primary transfer on the intermediate transfer belt 48.

The fixing portion 60 includes a heating rotational member 61 and a pressuring rotational member 62. The heating rotating member 61 and the pressuring rotating member 62 sandwich the paper T that includes the secondary-transfer toner image, to thereby melt and pressurize the toner, and fix that toner onto the paper T.

Figure 3:
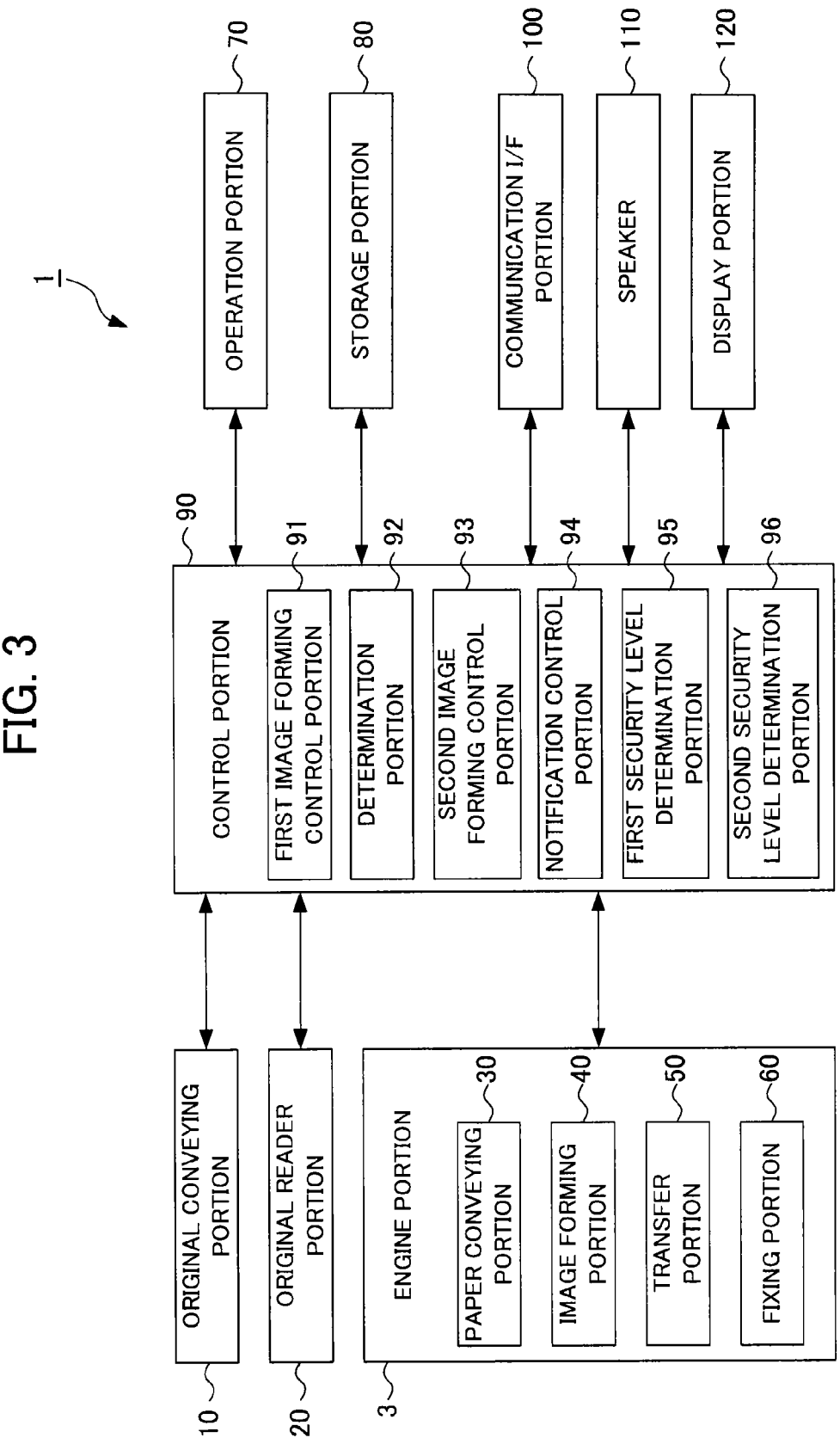
FIG. 3 is a block diagram showing the functional configuration of the copying machine 1.

Next, the functional configuration of the copying machine 1 will be described. FIG. 3 is a block diagram showing the functional configuration of the copying machine 1.

The copying machine 1 includes the above constituent elements (the original conveying portion 10, the original reader portion 20, the paper conveying portion 30, the image forming portion 40, the transfer portion 50, and the fixing portion 60). An engine portion 3 is configured from the paper conveying portion 30, the image forming portion 40, the transfer portion 50, and the fixing portion 60. Description of those constituent elements that have been described with reference to FIG. 2 will be omitted. In addition to the functional configuration described above, the copying machine 1 includes an operation portion 70 acting as an input portion, a storage portion 80, a control portion 90, a communication I/F (interface) portion 100 acting as a reception portion, a speaker portion 110 acting as a reporting portion, and a display portion 120 acting as a notification portion.

The operation portion 70 includes a numeric keypad (not shown), a touch panel (not shown), a start key (not shown), and the like. The numeric keypad is operated for input of numerals related to print copy number and the like. The touch pad displays a plurality of keys or the like that are allocated to various functions (for example, a setting function for the copy magnification, a function for allocating a plurality of pages to a single sheet T (2 in1) or the like). The keys displayed on the touch panel is operated (by touch) in order to execute any of the various functions on the copying machine 1. The start key is operated to execute printing. In response to operation of any of the keys, the operation portion 70 supplies a signal expressing operation of the key to the control portion 90.

The storage portion 80 is configured from a hard disk, a semiconductor memory, or the like. The storage portion 80 stores image data based on the original G read by the original reader portion 20. The storage portion 80 stores control programs used in the copying machine 1, and data used in relation to these control programs.

The control portion 90 is configured from a ROM (read only memory) that stores various types of control programs, a RAM (random access memory) that temporarily stores data, and a CPU (central process portion) that reads a control program or the like from the ROM, and the like.

The control portion 90 controls the original conveying portion 10, the original reader portion 20, the engine portion 3, the touch panel that configures the operation portion 70, the storage portion 80, the communication I/F portion 100, the speaker 110, and the display portion 120.

An example illustrating copying of an original G mounted on the original placing portion 11 will be described in relation to the function (operation) of the control portion 90. Firstly the control portion 90 detects the operation of the start key due to supply of a signal from the control portion 90 that indicates that the start key configuring the operation portion 70 has been operated. Then, the control portion 90 drives the first roller 12 of the original conveying portion 10 to thereby supply the original G to the first reading surface 21a. The control portion 90 produces image data based on the original G supplied to the first reading surface 21a by the original reader portion 20, and temporarily stores the image data in the storage portion 80.

The control portion 90 respectively controls the paper conveying portion 30 configuring the engine portion 3, the image forming portion 40, the transfer portion 50, and the fixing portion 60 to thereby form a toner image on the paper T based on the image data that that is temporarily stored in the storage portion 80. In other words, the control portion 90 drives the second roller 31 and the third roller 32 to convey the paper T to the transfer portion 50. The control portion 90 supplies color image data produced in relation to each color based on the image data to the respective laser scanning portions 43 to thereby form an electrostatic latent image on the photoreceptor drum 41 using the laser light irradiated from the laser scanning portions 43. The control portion 90 forms a toner image on the photoreceptor drum 41 using the developing portion 44, and the toner image is subjected to primary transfer onto the intermediate transfer belt 40. The control portion 90 uses the secondary transfer roller 51 to perform secondary transfer of primary-transfer image from the intermediate transfer belt 48 of the toner image onto the paper T. The control portion 90 performs control so that the heating rotating member 61 is heated to a predetermined temperature to thereby melt the toner on the secondary-transfer toner image onto the paper T with the heating rotating member 61, and fixes the toner to the paper T with the pressuring rotating member 62 that is pressured into contact by the heating rotating member 61. The control portion 90 uses the first paper conveying portion 30 to eject the paper T with the toner image fixed thereto from the second paper ejection portion 34.

The communication I/F portion 100 is configured by a network interface, or the like. The communication I/F portion 100 performs sending and receipt of data with the information processing apparatus 150 through the communication cable C. The communication I/F portion 100 for example receives image data sent from the information processing apparatus 150, and supplies the data to the control portion 90.

The speaker 110 outputs a signal supplied from the control portion 90 to an external portion.

The display portion 120 is configured from the touch panel described above and/or a liquid crystal display (LCD) provided separately to the touch panel, an organic EL (electroluminescence) display, or the like. The display portion 120 displays various types of data according to the control of the control portion 90.

The functional configuration of the characteristic portions of the copying machine 1 according to the present embodiment will be described hereafter making reference to FIG. 3.

As shown in FIG. 3, the control portion 90 includes a first image forming control portion 91, a determination portion 92, a second image forming control portion 93, a notification control portion 94, a first security level determination portion 95, and a second security level determination portion 96.

The first image forming control portion 91 forms an image on the paper T using the engine portion 3 based on the image data received by the communication I/F portion 100. Since the image data according to the present embodiment is confidential, a password and/or a security level are preset in the information processing apparatus 150.

The image data is configured from a header and actual data.

The header is configured from data added to the actual data such as a file name for the image data, a user ID (identification) of the user who prepared the image data, a set password, and a set security level, or the like.

The actual data is data that forms the main body when forming the image.

The first image forming control portion 91 receives image data with a password set thereto from the communication I/F portion 100, and stores the received image data M1 in the storage portion 80. Thereafter, upon receipt of input of a user ID from the user via the operation portion 70, the password input screen is displayed on the display portion 120.

The first image forming control portion 91 uses the engine portion 3 to form an image on the paper sheet T based on the image data when a password input by a user through the operation portion on the password input screen and set in relation to image data stored in the storage portion 80 coincides with a password input from the operation portion 70. The image data stored in the storage portion 80 forms an image based on the image data, and thereafter is deleted from the storage portion 80 by the control portion 90.

The copying machine 1 according to the present embodiment executes the processing as described below in order to print the image data having a password set thereto in a more suitable manner.

When new image data M1 is received by the communication I/F portion 100, the determination portion 92 determines whether or not a password P1 set to the new image data M1 coincides with the password P2 set to the image data M2 stored in the storage portion 80. The new image data M1 and the image data stored in the storage portion 80 is one or a plurality of image data.

When the determination portion 92 determines that the password P1 set in relation to the new image data M1 received from the communication I/F portion 100 coincides with the password P2 set in relation to the image data M2 stored in the storage portion 80, the image forming control portion 93 does not form an image based on the new image data M1 using the first image forming control portion 91.

"Does not form an image based on the new image data M1 using the first image forming control portion 91" as used herein more specifically means the suspension of receipt of image data during receipt of new image data M1 by the communication I/F portion 100, and deletion of the new image data M1 stored in the RAM of the control portion 90 when all of the image data M1 is received by the communication I/F portion 100, and all of the new image data M1 is stored in the RAM of the control portion 90.

When the determination portion 92 determines that the password P1 set in relation to the new image data M1 received from the communication I/F portion 100 coincides with the password P2 set in relation to the image data M2 stored in the storage portion 80, and an image is not formed based on the new image data M1 by the first image forming control portion 91, the notification control portion 94 notifies that an image is not formed based on the new image data M1.

More specifically, the notification control portion 94 displays a message that formation of an image based on the new image data M1 (for example, "printing failed due to setting of same password to other data") on the display portion 120. The notification control portion 94 sends notification data D, including the message showing that image formation based on the new image data M1 above will not be performed, to the information processing apparatus 150. The information processing apparatus 150 displays the message including the sent notification data D on the display portion 155 of the information processing apparatus 150 (refer to FIG. 4). The notification control portion 94 may use the speaker 110 to produce a warning alarm indicating that image formation based on the new image data M1 above will not be performed.

As described above, a plurality of levels of security levels L1 and L2 may be set in addition to passwords respectively in relation to the new image data M1 received from the communication I/F portion 100 and the image data M2 stored in the storage portion 80.

In this case, when the new image data M1 is received by the communication I/F portion 100, the first security level determination portion 95 determines whether or not the security level L1 of the new image data M1 is set to a higher level than a predetermined security level Lx.

More specifically, when three levels of security levels for image data being a security level A (high security level), level B (medium security level), and level C (low security level) can be set, the first security level determination portion 95 for example determines whether or not the security level L1 of the new image data M1 is set higher than the level C (that is to say, whether it is level A or B).

When the determination portion 92 determines that the password P1 set in relation to the new image data M1 received from the communication I/F portion 100 coincides with the password P2 set in relation to the image data M2 stored in the storage portion 80, and the first security level determination portion 95 determines that the security level L1 of the new image data M1 is set to a level higher than the predetermined security level Lx, the image forming control portion 93 does not perform image formation based on the new image data M1 using the first image forming control portion 91.

When the determination portion 92 determines that the password P1 set in relation to the new image data M1 received from the communication I/F portion 100 coincides with the password P2 set in relation to the image data M2 stored in the storage portion 80, and the first security level determination portion 95 determines that the security level L1 of the new image data M1 is not set to a level higher than the predetermined security level Lx, the image forming control portion 93 performs image formation based on the new image data M1 using the first image forming control portion 91.

When the new image data M1 is received from the communication I/F portion 100, the second security level determination portion 96 determines whether or not the security level L2 of the image data M2 stored in the storage portion 80 is higher than the security level L1 of the new image data M1.

More specifically, when the security level L2 of the image data M2 that has the highest security level of the image data M2 that is stored in the storage portion 80 has a security level of A, and the security level L1 of the new image data M1 has a security level of B, the second security level determination portion 96 determines that the security level L2 of the image data M2 stored in the storage portion 80 is set higher than the security level L1 of the new image data M1.

When the security level L2 of the image data M2 stored in the storage portion 80 is level B or level C, and the security level L2 of the new image data M1 is level A, the second security level determination portion 96 determines that the security level L2 of the image data M2 stored in the storage portion 80 is not set higher than the security level L1 of the new image data M1.

When the determination portion 92 determines that the password P1 set in relation to the new image data M1 received from the communication I/F portion 100 coincides with the password P2 set in relation to the image data M2 stored in the storage portion 80, the first security level determination portion 95 determines that the security level L1 of the new image data M1 is not set to a higher level than a predetermined security level Lx, and the second security level determination portion 96 determines that the security level L2 of the image data M2 stored in the storage portion 80 is higher than the security level L1 of the new image data M1, the image forming control portion 93 does not form an image based on the new image data M1 using the first image forming control portion 91.

Figure 4:
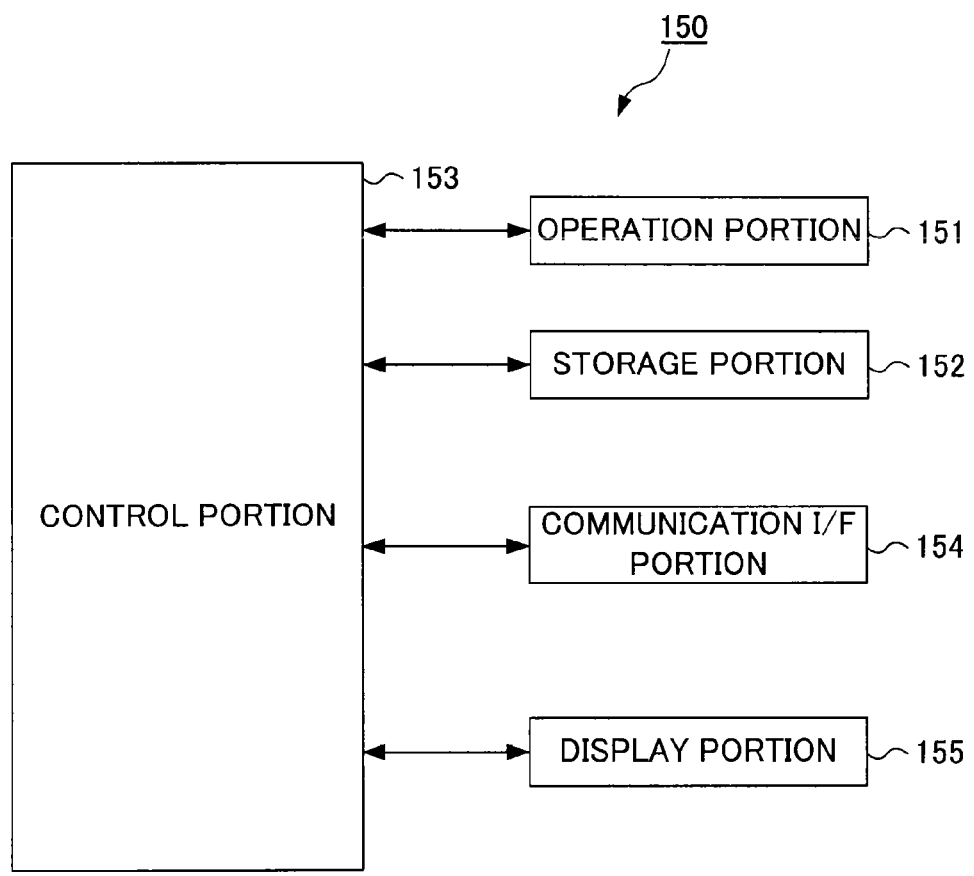
FIG. 4 is a block diagram showing the functional configuration of an information processing apparatus 150.

Next, the functional configuration of the information processing apparatus 150 according to the present invention will be described. FIG. 4 is a block diagram showing the functional configuration of an information processing apparatus 150.

As shown in FIG. 4, the information processing apparatus 150 includes an operation portion 151, a storage portion 152, a control portion 153, a communication I/F portion 154, and the display portion 155.

The operation portion 151 is configured from a keyboard, a mouse or the like. The operation portion 151 for example accepts operations from a user to print image data.

The storage portion 152 is configured from a hard disk, a semiconductor memory, or the like. The storage portion 152 stores various types of information such as image sent to the copying machine 1.

The control portion 153 is configured from a ROM that stores various types of control programs, a RAM that temporarily stores data, and a CPU that reads a control program or the like from the ROM, and the like.

When an operation for printing image data is received by the operation portion 151, the control portion 153 sends image data in accordance with the operation through the communication I/F portion 154 to the copying machine 1. The control portion 153 uses the control program stored in the ROM to set a password and a security level in relation to the image data. The password and a security level are set in an arbitrary manner by a user using the operation portion 151.

The communication I/F portion 154 is configured by the network interface, or the like, and receives and sends data with the copying machine 1 through the communication cable C. The communication I/F portion 154 for example sends image data to the copying machine 1 in accordance with the control of the control portion 153. The communication I/F portion 154 receives notification data D including a message indicating that image formation based on the new image data M1 will not be performed, and supplies the notification data D to the control portion 153.

The display portion 155 is configured from a liquid crystal display (LCD), an organic EL display, or the like. The display portion 155 displays an image based on the image data in accordance with the control of the control portion 153. The display portion 155 displays a message including the notification data D based on the notification data D received from the communication I/F portion 154 in accordance with the control of the control portion 153.

The processing in relation to the configuration of the characteristic portions of the information processing apparatus 150 and the copying machine 1 according to the present embodiment will be described below. FIG. 5 is a flowchart showing the process of forming an image by a copying machine 1 using image data M1 having a password P1 set thereto.

In a step ST1, the communication I/F portion 154 of the information processing apparatus 150 sends new image data M1 having a password set thereto to the copy device 1 in accordance with the control of the control portion 153.

In a step ST2, the communication I/F portion 100 of the copy device 1 receives new image data M1 that has been sent. Then the control portion 90 temporarily stores a part (for example, only the header) or the whole of the newly received image data M1 in the RAM of the control portion 90.

In a step ST3, upon receipt of new image data M1 from the communication I/F portion 100, the determination portion 92 determines whether or not the password P1 set to the new image data M1 coincides with the password P2 set to the image data M2 stored in the storage portion 80, that is to say, whether or not the password P1 coincides with the password P2. When the password P1 coincides with the password P2 (YES), the processing proceeds to a step ST4. When the password P1 does not coincide with the password P2 (NO), the processing proceeds to a step ST11.

In the step ST4, upon receipt of new image data M1 from the communication I/F portion 100, the first security determination portion 95 determines whether or not the security level L1 of the new image data M1 is set higher than the predetermined security level Lx, that is to say, whether or not the security level L1>the security level Lx. When the security level L1>the security level Lx (YES), the processing proceeds to a step ST6. When the security level L1 the security level Lx (NO), the processing proceeds to a step ST5.

In the step ST5, upon receipt of new image data M1 from the communication I/F portion 100, the second security determination portion 96 determines whether or not the security level L2 of the new image data M2 stored in the storage portion 80 is set higher than the security level L12 of the new image data M1, that is to say, whether or not the security level L2>the security level L1. When the security level L2>the security level L1 (YES), the processing proceeds to a step ST6. When the security level L2≤the security level L1 (NO), the processing proceeds to a step ST11.

In the step ST6, the second image forming control portion 93 does not form an image based on the new image data M1 with the first image forming control portion 91.

In a ST7, the notification control portion 94 sends notification data D, including the message showing that image formation based on the new image data M1 above will not be performed, to the information processing apparatus 150.

In a step ST8, the notification control portion 94 displays a message on the display portion 120 that formation of an image will not be executed based on the new image data M1.

In a step ST9, the communication I/F portion 154 receives the notification data D sent from the copy device 1.

In a step ST10, the control portion 53 displays a message including the received notification data D on the display portion 155.

In a step ST11, the first image forming control portion 91 displays a password input screen on the display portion 120 upon receipt of the input of a user ID from a user via the operation portion 70.

In a step ST12, the first image forming control portion 91 receives input of the password P4 from a user via the operation portion 70 on the password input screen.

In a step ST13, the first image forming control portion 91 determines whether or not the password P1 set for the new image data M1 coincides with the password P4 input via the operation portion 70. When the password P1 coincides with the password P4 (YES), the processing proceeds to a step ST14. When the password P1 does not coincide with the password P4 (NO), the processing proceeds to a step ST15.

In the step ST14, the first image forming control portion 91 executes formation of an image on the paper T with the engine portion 3 based on the new image data M1.

In a step ST15, the first image forming control portion 91 does not execute formation of an image on the paper sheet T with the engine portion 3 based on the new image data M1.

In a step ST16, the first image forming control portion 91 for example displays a message such as "password is incorrect" via the notification control portion 94 on the display portion 120.

The following effects are enabled by a copying machine 1 according to the present embodiment.

In the present embodiment, the second image forming control portion 93 does not execute image formation based on the new image data M1 with the first image forming control portion 91 when the determination portion 92 determines that the password P1 set to the new image data M1 received from the communication I/F portion 100 coincides with the password P2 set to the image data M2 stored in the storage portion 80. Consequently, the copying machine 1 prevents printing of new image data M1 as a result of input of a password by a user not authorized for such printing caused by an erroneous operation or as a result of the accidental setting of the same password in relation to the new image data M1 and the image data M2 stored in the storage portion 80. Consequently, the copying machine 1 enables more suitable printing of new image data M1 that is confidential.

Furthermore in the present embodiment, the notification control portion 94 executes a notification that image formation based on the new image data M1 will not be executed when the determination portion 92 determines that the password P1 set in relation to the new image data M1 received from the communication I/F portion 100 coincides with the password P2 set in relation to the image data M2 stored in the storage portion 80, and that the first image forming control portion 91 will not perform image formation based on the new image data M1. As a result, since the copying machine 1 notifies that image formation based on the new image data M1 will not be executed, a user of the information processing apparatus 150 who is attempting to execute image formation based on the new image data M1 can recognize that there is a problem with the new image data M1 (for example, that the password coincides with other image data). Therefore, the copying machine 1 enables an improvement in security when printing new image data M1 since a user of the information processing apparatus 150 can eliminate a problem associated with new image data M1 (for example, change the password).

In the present embodiment, the second image forming control portion 93 does not execute image formation based on the new image data M1 with the first image forming control portion 91 when the determination portion 92 determines that the password P1 set in relation to the new image data M1 received from the communication I/F portion 100 coincides with the password P2 set in relation to the image data M2 stored in the storage portion 80, and the first security level determination portion 95 determines that the security level L1 of the new image data M1 is set to a level higher than the predetermined security level Lx.

On the other hand, the second image forming control portion 93 executes image formation based on the new image data M1 with the first image forming control portion 91 when the determination portion 92 determines that the password P1 set in relation to the new image data M1 received from the communication I/F portion 100 coincides with the password P2 set in relation to the image data M2 stored in the storage portion 80, and the first security level determination portion 95 determines that the security level L1 of the new image data M1 is not set to a level higher than the predetermined security level Lx.

As a result, the copying machine 1 does not execute image formation based on the new image data M1 when the security level of the new image data M1 is high, that is to say, when the confidentiality of the image data M1 is high. On the other hand, the copying machine 1 executes image formation based on the new image data M1, and when the security level of the new image data M1 is low, that is to say, when the confidentiality of the image data M1 is low. Consequently, the copying machine 1 enables more suitable printing of new image data M1 that is confidential in response to the security level of the new image data M1.

In the present embodiment, the image forming control portion 93 does not perform image formation based on the new image data M1 using the first image forming control portion 91 when the determination portion 92 determines that the password P1 set in relation to the new image data M1 received from the communication I/F portion 100 coincides with the password P2 set in relation to the image data M2 stored in the storage portion 80, the first security level determination portion 95 determines that the security level L1 of the new image data M1 is not set to a level higher than the predetermined security level Lx, and the second security level determination portion 96 determines that the security level L2 of the image data M2 stored in the storage portion 80 is higher than the security level L1 of the new image data M1. As a result, when the security level of previous received image data M2 is high, and subsequently received new image data M1 has a low security level, the copying machine 1 prevents printing of the subsequently received new image data M1 as a result of use of the password P2 for the previously received image data M2.

Although the preferred embodiments of the present invention have been described above, the present invention is not thereby limited to such embodiment, and may be executed in various aspects. For example, in the above embodiments, although the second image forming control portion 93 executed control so that image formation based on new image data M1 was not performed by the first image forming control portion 91 when the security level L1 of the new image data M1 is set higher than the predetermined security level Lx, the present invention is not thereby limited. For example, in substitution for the predetermined security level Lx, the second image forming control portion 93 may execute control so that image formation is prevented when for example, the number of sheets for printing of the new image data M1 is greater than or equal to a predetermined sheet number, or when a file name or individual's name is included in the header of the new image data M1.

Although the copying machine 1 according to the present embodiment is a color copying machine. However there is no limitation to this configuration, and it may be a monochrome copying machine.

The copying machine 1 according to the present embodiment transfers a toner image onto paper T via the intermediate transfer belt 48 (indirect transfer configuration). However there is no limitation to this configuration, and the toner image formed by the photosensitive drum may be directly transferred onto the paper T (direct transfer configuration).

The copying machine 1 according to the present embodiment is configured to print on one side of the paper T. However there is no limitation to this configuration, and double-sided printing of the sheet may be executed.

The image forming apparatus according to the present invention is not limited to the copying machine 1 above. In other words, the image forming apparatus according to the present invention may relate to a multifunction peripheral combining a copying function, a facsimile function, a printer function, and a scanning function, or may be a facsimile or a printer.

Furthermore the transfer medium that fixes the toner image with the image forming apparatus according to the present invention is not limited to a paper T, and may include for example, a plastic sheet for an OHP (overhead projector) sheets, or the like.

What is claimed is:
1. An image forming apparatus comprising:
a reception portion that receives image data with a password applied thereto from an external device;
a storage portion that stores the image data received by the reception portion;
an input portion that inputs a password from a user;
a first image forming control portion that forms an image on a transfer medium based on the image data when a password set to image data stored in the storage portion coincides with a password input from the input portion;
a determination portion that determines whether or not a password set to new image data coincides with a pass- word set to image data stored in the storage portion, when new image data is received by the reception portion; and a second image forming control portion that does not execute image formation based on the new image data with the first image forming control portion when the determination portion determines that the password set to image data stored in the storage portion coincides with the password set to new image data received by the reception portion, wherein a plurality of security levels is set respectively to the image data stored in the storage portion and to the new image data received by the reception portion, wherein the image forming apparatus further comprises:

a first security level determination portion that determines whether or not the security level of the new image data is higher than a predetermined security level when the new image data is received by the reception portion; and a second security level determination portion that determines whether or not the security level of the image data stored in the storage portion is higher than the security level of the new image data, when new data is received by the reception portion, wherein the second image forming control portion does not execute image formation based on the new image data with the first image forming control portion when the determination portion determines that the password set to image data stored in the storage portion coincides with the password set to new image data received by the reception portion, and the first security level determination portion determines that the security level of the new image data is higher than the predetermined security level, wherein the second image forming control portion executes image formation based on the new image data with the first image forming control portion when the determination portion determines that the password set to image data stored in the storage portion coincides with the password set to new image data received by the reception portion, and the first security level determination portion determines that the security level of the new image data is not higher than the predetermined security level, and wherein the second image forming control portion does not execute image formation based on the new image data with the first image forming control portion when the determination portion determines that a password set to image data stored in the storage portion coincides with a password set to new image data received by the reception portion, and the first security level determination portion determines that the security level of the new image data is not higher than the predetermined security level, and the second security level determination portion determines that the security level of the image data stored in the storage portion is higher than the security level of the new image data.

2. The image forming apparatus according to claim 1 further comprising a notification portion that notifies that an image will not be formed based on the new image data, when image formation is not executed based on the new image data with the first image forming control portion.

3. An image forming apparatus comprising:

a reception portion that receives image data with a password applied thereto from an external device;

a storage portion that stores the image data received by the reception portion;

an input portion that inputs a password from a user;

a first image forming control portion that forms an image on a transfer medium based on the image data when a password set to image data stored in the storage portion coincides with a password input from the input portion;

a determination portion that determines whether or not a password set to new image data coincides with a password set to image data stored in the storage portion, when new image data is received by the reception portion;

a second image forming control portion that does not execute image formation based on the new image data with the first image forming control portion when the determination portion determines that the password set to image data stored in the storage portion coincides with the password set to new image data received by the reception portion;

a notification portion that notifies that an image will not be formed based on the new image data, when image formation is not executed based on the new image data with the first image forming control portion;

a first security level determination portion that determines whether or not the security level of the new image data is higher than a predetermined security level, when the new image data is received by the reception portion; and a second security level determination portion that determines whether or not the security level of the image data stored in the storage portion is higher than the security level of the new image data, when the new data is received by the reception portion, wherein a plurality of security levels is set respectively to the image data stored in the storage portion and to the new image data received by the reception portion; and wherein the second image forming control portion does not execute image formation based on the new image data with the first image forming control portion when the determination portion determines that a password set to image data stored in the storage portion coincides with a password set to new image data received by the reception portion, the first security level determination portion determines that the security level of the new image data is not higher than the predetermined security level, and the second security level determination portion determines that the security level of the image data stored in the storage portion is higher than the security level of the new image data.

* * * * *